United States Patent
Smith et al.

(10) Patent No.: US 10,218,711 B2
(45) Date of Patent: Feb. 26, 2019

(54) PROVIDING GEOGRAPHIC PROTECTION TO A SYSTEM

(71) Applicant: Intel Corporation, Santa Clara, CA (US)

(72) Inventors: Ned M. Smith, Beaverton, OR (US); Simon P. Johnson, Beaverton, OR (US); Steve Orrin, Santa Clara, CA (US); Willard M. Wiseman, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 231 days.

(21) Appl. No.: 15/152,755

(22) Filed: May 12, 2016

(65) Prior Publication Data
US 2016/0255097 A1  Sep. 1, 2016

Related U.S. Application Data

(62) Division of application No. 13/530,773, filed on Jun. 22, 2012, now Pat. No. 9,367,688.

(51) Int. Cl.
| | |
|---|---|
| *H04L 29/06* | (2006.01) |
| *G06F 21/57* | (2013.01) |
| *H04W 4/021* | (2018.01) |
| *H04W 12/06* | (2009.01) |
| *H04W 12/08* | (2009.01) |

(52) U.S. Cl.
CPC ............ *H04L 63/107* (2013.01); *G06F 21/57* (2013.01); *H04W 4/021* (2013.01); *H04W 12/06* (2013.01); *H04W 12/08* (2013.01); *G06F 21/575* (2013.01); *G06F 2221/2111* (2013.01)

(58) Field of Classification Search
CPC ......................... G06F 21/575; G06F 221/2111
See application file for complete search history.

(56) References Cited

U.S. PATENT DOCUMENTS

| 7,051,196 B2 | 5/2006 | Angelo et al. |
| 7,496,956 B1 * | 2/2009 | Viljoen .................. G06F 21/54 709/244 |
| 2002/0177449 A1 | 11/2002 | McDonnell et al. |

(Continued)

FOREIGN PATENT DOCUMENTS

| EP | 2194476 | 6/2010 |
| KR | 10-2012-000617 | 1/2012 |

OTHER PUBLICATIONS

Intel, "Intel® Trusted Execution Technology (Intel® TXT), Software Development Guide, Measured Launched Environment Developer's Guide," Mar. 2011, 112 pages.

(Continued)

*Primary Examiner* — Henry Tsang
(74) *Attorney, Agent, or Firm* — Trop, Pruner & Hu, P.C.

(57) ABSTRACT

In one embodiment, a method includes determining a location of a system responsive to location information received from at least one of a location sensor and a wireless device of the system, associating the location with a key present in the system to generate an authenticated location of the system, and determining whether the authenticated location is within a geofence boundary indicated in a location portion of a launch control policy (LCP) that provides a geographic-specific policy. Other embodiments are described and claimed.

20 Claims, 9 Drawing Sheets

(56) References Cited

U.S. PATENT DOCUMENTS

| | | | |
|---|---|---|---|
| 2003/0005316 A1* | 1/2003 | Girard | G06F 21/88 |
| | | | 713/193 |
| 2003/0010591 A1 | 1/2003 | Fujiwara et al. | |
| 2003/0105971 A1* | 6/2003 | Angelo | G06F 21/31 |
| | | | 726/5 |
| 2006/0015717 A1 | 1/2006 | Zhengrong et al. | |
| 2008/0126779 A1 | 5/2008 | Smith | |
| 2008/0207165 A1 | 8/2008 | Eckhart | |
| 2008/0235754 A1 | 9/2008 | Wiseman et al. | |
| 2008/0244292 A1 | 10/2008 | Kumar et al. | |
| 2009/0085761 A1* | 4/2009 | Buer | G06Q 20/4016 |
| | | | 340/686.1 |
| 2009/0100260 A1 | 4/2009 | Govindarajan | |
| 2009/0132837 A1 | 5/2009 | Kumar | |
| 2009/0172381 A1* | 7/2009 | Zimmer | G06F 9/4401 |
| | | | 713/2 |
| 2009/0172438 A1 | 7/2009 | Kumar | |
| 2009/0327678 A1 | 12/2009 | Dutton et al. | |
| 2010/0082898 A1* | 4/2010 | Mangold | G06F 12/02 |
| | | | 711/113 |
| 2010/0082930 A1 | 4/2010 | Jiva et al. | |
| 2010/0082960 A1* | 4/2010 | Grobman | G06F 21/575 |
| | | | 713/2 |
| 2010/0082987 A1 | 4/2010 | Thom et al. | |
| 2010/0205316 A1* | 8/2010 | Xue | H04L 63/062 |
| | | | 709/229 |
| 2011/0145598 A1 | 6/2011 | Smith | |
| 2011/0230211 A1* | 9/2011 | Kim | G06F 21/71 |
| | | | 455/456.4 |
| 2011/0320823 A1 | 12/2011 | Saroiu et al. | |
| 2012/0030730 A1 | 2/2012 | Smith et al. | |
| 2012/0151223 A1 | 6/2012 | Conde Marques et al. | |
| 2014/0025939 A1* | 1/2014 | Smith | G06F 9/24 |
| | | | 713/2 |
| 2014/0109191 A1* | 4/2014 | Raghuram | H04L 67/1097 |
| | | | 726/4 |

OTHER PUBLICATIONS

Intel, "Trusted Execution Technology Architectural Overview," 2003, 8 pages.

Intel, White Paper, "Trusted Execution Technology, Hardware-based Technology for Enhancing Server Platform Security," 2010, 8 pages.

International Patent Application No. PCT/US11/67573 filed Dec. 28, 2011, entitled "Method and Apparatus to Determined User Presence," by Victoria C. Moore.

International Searching Authority, "Notification of Transmittal of the International Search Report and the Written Opinion of the International Searching Authority," dated Sep. 27, 2013, in International application No. PCT/US2013/044939.

Intel, "Intel Trusted Execution Technology (Intel TXT)", Jan. 18, 2012 (Jan. 18, 2012), XP055234373, Retrieved Tom the Internet: URL:http://www.intel.com/content/www/us/en/software-developers/intel-txt-software-development-guide.html [retrieved on Dec. 8, 2015].

Intel, "Creating a Secure Computing Environment", Intel Technology Brief, Dec. 31, 2009 (Dec. 31, 2009 ), XP055115873, Retrieved from the Internet: URL:http://www.intel.de/content/dam/www/public/us/en/documents/technology-briefs/creating-secure-environment -brief.pdf [retrieved on Apr. 29, 2014].

European Patent Office, Extended European Search Report dated Jan. 14, 2016, in European Patent Application No. 13807277.2.

State Intellectual Property Office, People's Republic of China, First Office Action dated May 4, 2016 in Chinese Patent Application No. 201380026748.2.

\* cited by examiner

PROVIDING GEOGRAPHIC PROTECTION TO A SYSTEM

This application is a divisional of U.S. patent application Ser. No. 13/530,773, filed Jun. 22, 2012, the content of which is hereby incorporated by reference.

TECHNICAL FIELD

Embodiments relate to providing security to a platform based on geographic information.

BACKGROUND

In today's computing environments, there is an ever increasing presence of portable devices that provide a user access to both local computing resources on the portable platform, as well as access to remote resources via communication over a network. Because such platforms can be subject to malicious attack, either by way of malware, virus, or by physical theft of the platform, security concerns with regard to both data and software present on the platform, as well as unauthorized access to remote networks using the platform are of a concern.

DETAILED DESCRIPTION

Figure 1:
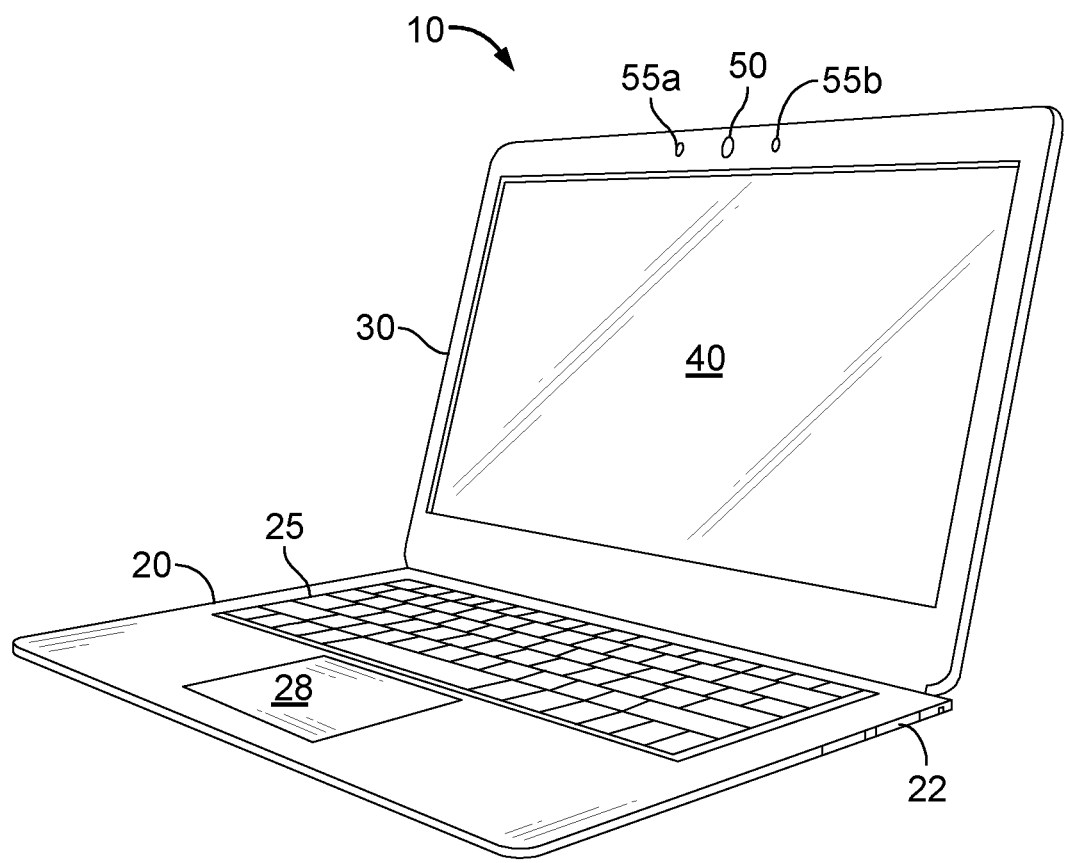
FIG. 1 is an illustration of a laptop computer in accordance with an embodiment of the present invention.

In various embodiments, one or more geographic-based access control policies, each referred to herein as a geofencing policy, can be created for a given system and can enable a binding of a location of the system to such policy. More specifically, this binding can be analyzed and enforced at a launch of the system or at a launch of a software agent subject to such geofencing policy using a platform root of trust. In this way, a trusted mechanism can be used to identify the platform location, determine whether a given geofencing policy is in place and if so, to determine whether a requested access is allowed. If the access is allowed the requested agent can be launched, and if not, a recovery agent can instead be accessed. In other implementations, such enforcement mechanism may not apply and instead, the location and policy information can be used to generate log entries to thus identify and store the system location and activated software agent.

In various embodiments, specific keys, e.g., asymmetric signing keys can be associated with specific geographies. After authoring such keys, they can be stored in a trusted location of a system, such as a trusted platform module in accordance with the Trusted Computing Group (TCG) TPM Specification Version 1.2 (Oct. 2, 2003) or another such specification. However, understand the scope of the present invention is not limited in this regard and such keys can be stored in another protected location such as a static random access memory (SRAM) in a security co-processor, or as encrypted data blobs that are only decrypted when protected by a secure enclave (SE) processor mode.

After creating and storing such keys, the keys can be accessed during normal use when a given launch of a platform is desired. Note that this launch may be a power up of the computer via a boot process or can be a launch of a given agent requested by a user during normal system operation. In this way, enforcement of different policies can be made in different geographies. A given geo-specific key can be obtained via a trusted launch control policy (LCP) measurement mechanism to enable secrets to be generated and sealed to a current geography. In certain embodiments including a TPM, the TPM can determine in which geography the platform is located and can also provide the requested keys to a trusted agent to enable the various operations including a logging mechanism as well as an enforcement mechanism.

In some embodiments, an authenticated location can be determined using platform hardware, including various location sensors and/or wireless communication devices, along with secure hardware. In this way, an attestation of an actual location, indoors or outdoors, can be determined and recorded so that it can be used in logging and enforcing a given geofence policy.

To this end, embodiments may provide a cryptographic binding between geography specific keys and platform hardware. In addition, embodiments may provide authenticated location information to a trusted execution environment such as an authenticated code module (ACM). Still further, embodiments may provide trusted attestation reports, e.g., via a TPM, which may contain platform location and compliance to one or more geofence policies. Furthermore, enforcement of a given geofence policy may occur as part of a secure boot process. Such activities may be enabled in part via assignment of specific policy keys to specific geographies, along with recording of location information to a trusted execution environment such as an ACM, and providing for attestation of location and geofence policy compliance.

While embodiments can be implemented in different platform types, certain embodiments are particularly applicable to use on a portable system such as an ultraportable notebook or tablet device.

Referring now to FIG. 1, shown is an illustration of a laptop computer in accordance with an embodiment of the present invention. Various commercial implementations of system 10 can be provided. For example, system 10 can correspond to an Ultrabook™, an Apple MacBook Air™, or another ultralight and thin laptop computer (generally an ultrathin laptop). Further, as will be described herein, in some embodiments this laptop computer can be configurable to be convertible into a tablet computer.

With reference to FIG. 1, system 10 includes a base portion 20 which may be configured via a lightweight chassis that can include substantially all of the electronics circuitry of the system. For user interfaces, a keyboard 25 and a touchpad 28 may be provided in base portion 20. In addition, various ports for receiving peripheral devices, such as universal serial bus (USB) ports (including a USB 3.0 port), a Thunderbolt port, video ports such as a micro high definition media interface (HDMI) or mini video graphics adapter (VGA), memory card ports such as a SD card port, and audio jack, among others may be present, generally indicated at location 22 on a side of the chassis (other user-accessible ports can be present on the opposing chassis side). In addition, a power port may be provided to receive DC power via an AC adapter (not shown in FIG. 1).

As further seen, a lid portion 30 may be coupled to base portion 20 and can include a display 40, which in different embodiments can be a liquid crystal display (LCD) or an organic light emitting diode (OLED). Furthermore, in the area of display 40, touch functionality may be provided such that a user can provide user input via a touch panel co-located with display 40. Lid portion 30 may further include various capture devices, including a camera device 50, which may be used to capture video and/or still information. In addition, dual microphones $55_a$ and $55_b$ may be present to receive user input via the user's voice. Although shown at this location in FIG. 1, the microphone, which can be one or more omnidirectional microphones, may be in other locations.

As will be described further below, system 10 may be configured with particular components and circuitry to enable a high end user experience via a combination of hardware and software of the platform. For example, using available hardware and software, perceptual computing can enable a user to interact with the system via voice, gesture, touch and in other ways. In addition, this user experience can be delivered in a very light and thin form factor system that provides high performance and low-power capabilities while also enabling advanced features such as instant on and instant connect so that the system can be placed into low power, e.g., sleep mode and directly awaken and be available to the user instantly (e.g., within two seconds of exiting the sleep mode). Furthermore upon such wake-up the system may be connected to networks such as the Internet, providing similar performance to that available in smartphones and tablet computers, which lack the processing and user experience of a fully featured system such as that of FIG. 1. Of course, although shown at this high level in the illustration of FIG. 1, understand that additional components are present within the system, such as loud speakers, additional displays, capture devices, environmental sensors and so forth, details of which are discussed further below.

Figure 2:
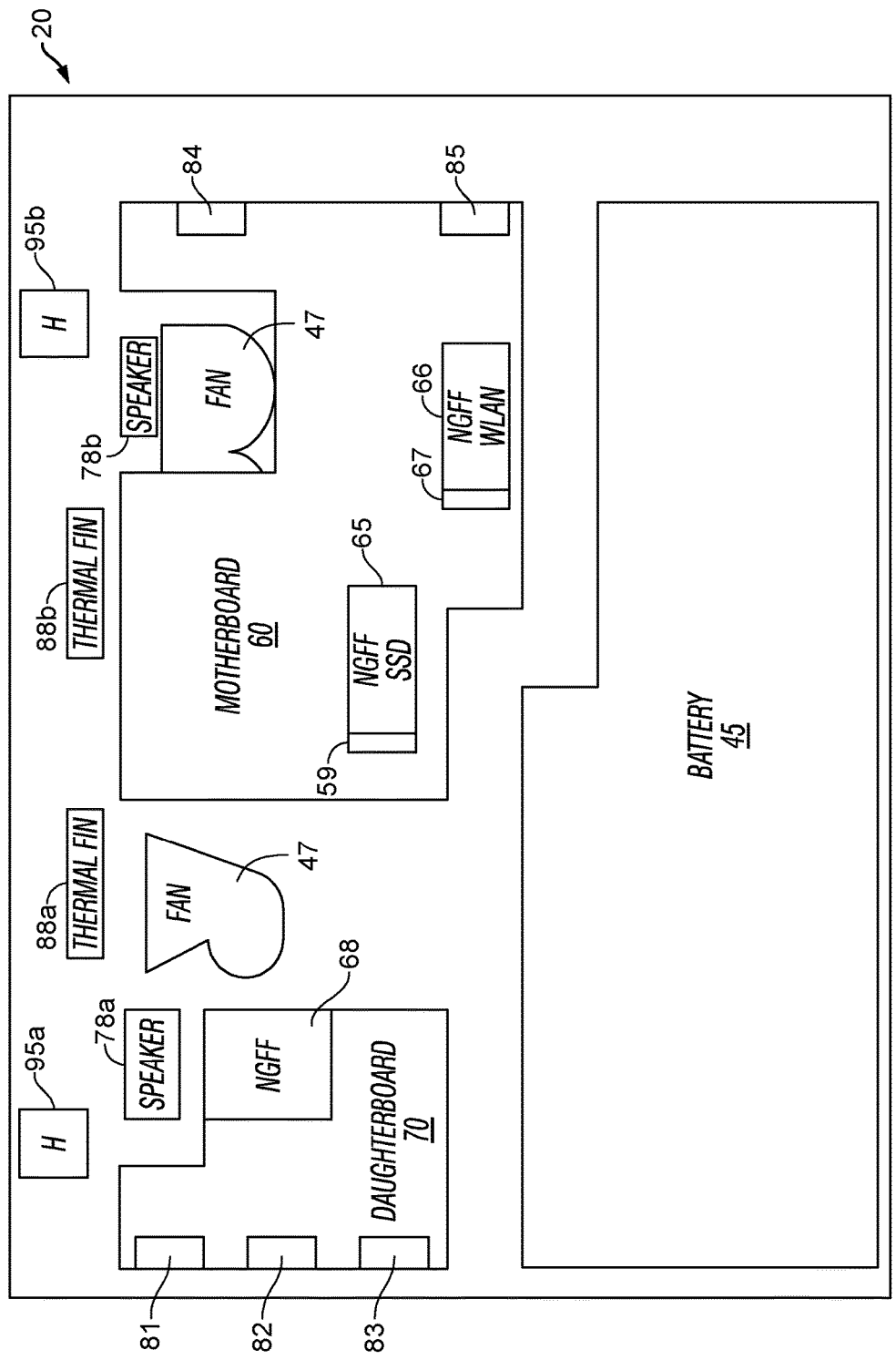
FIG. 2 is a top view of the placement of certain components within a base portion of a chassis in accordance with an embodiment of the present invention.

Referring now to FIG. 2, shown is a top view of the placement of certain components within a base portion of a chassis in accordance with an embodiment of the present invention. As shown in FIG. 2, base portion 20 can include substantially all of the electronics of the system, other than those associated with the display panel and any touch screen. Of course, the view shown in FIG. 2 is an example only and understand that different arrangements of components, including different components, different sizes and locations of components and other placement issues can certainly occur in other embodiments.

In general, the view in FIG. 2 is of the components within a chassis, other than a keyboard and touch pad which would generally be adapted over the components shown in FIG. 2 (with the keyboard over an upper portion of the view in FIG. 2, and the keypad generally in a lower and central portion of the view in FIG. 2).

Much of the circuitry of the system can be implemented on a motherboard 60 which can include various integrated circuits (ICs) and other circuitry including a processor such as a central processing unit (CPU), system memory and other ICs. Additional ICs and other circuitry can be implemented on a daughterboard 70 that may couple to motherboard 60. Daughterboard 70 can include interfaces to various ports and other peripheral connectors, including ports 81, 82 and 83 which may correspond to, e.g., USB, Ethernet, Firewire, Thunderbolt, or any other type of user-accessible connection. As seen, an add-in card 68 may couple to daughterboard 70, e.g., via a next generation form factor (NGFF) connector. Such connector in accordance with a NGFF design may provide a single connection type that can be used for add-in cards of different sizes with potentially different keying structures to ensure only appropriate add-in cards are inserted into such connectors. In the embodiment shown, this add-in card 68 may include wireless connectivity circuitry, e.g., for 3G/4G/LTE circuitry.

Similarly, motherboard 60 may provide interconnection to certain other user accessible ports, namely ports 84 and 85. In addition, several add-in cards 65 and 66 may couple to motherboard 60. In the embodiment shown, add-in card 65 may include an SSD and can couple to motherboard via a NGFF connector 59. Add-in card 66 may include, e.g., wireless local area network (WLAN) circuitry and can also be connected via a NGFF connector 67.

To provide cooling, some implementations may include one or more fans. In the embodiment shown, two such fans 47 may be provided which can be used to conduct heat from the CPU and other electronics and out via thermal fins $88_a$ and $88_b$, e.g., to vents within the chassis or to the chassis directly. However other embodiments may provide for a fanless system where cooling can be achieved by a combination of reduction in power consumption of the CPU and other components, and heat dissipation elements to couple hot components to the chassis or other ventilation elements.

To provide for advanced audio features, multiple speakers $78_a$ and $78_b$ may be provided and which can radiate out from a top portion of the chassis via a mesh or other ventilated pattern to provide for an enhanced sound experience. To enable interconnection between base portion 20 and a lid portion (not shown for ease of illustration in FIG. 2), a pair of hinges $95_a$ and $95_b$ may be provided. In addition to providing hinge capabilities, these hinges may further include pathways to provide connections between circuitry within the lid portion and base portion 20. For example, wireless antennas, touch screen circuitry, display panel circuitry and so forth all can communicate via connectors adapted through these hinges. As further shown, a battery 45 may be present which can be a lithium-ion or other high capacity battery may be used. Although shown with this particular implementation of components and placement of circuitry in FIG. 2, understand the scope of the present invention is not limited in this regard. That is, in a given system design there can be trade offs to more efficiently consume the available X-Y space in the chassis.

Figure 3:
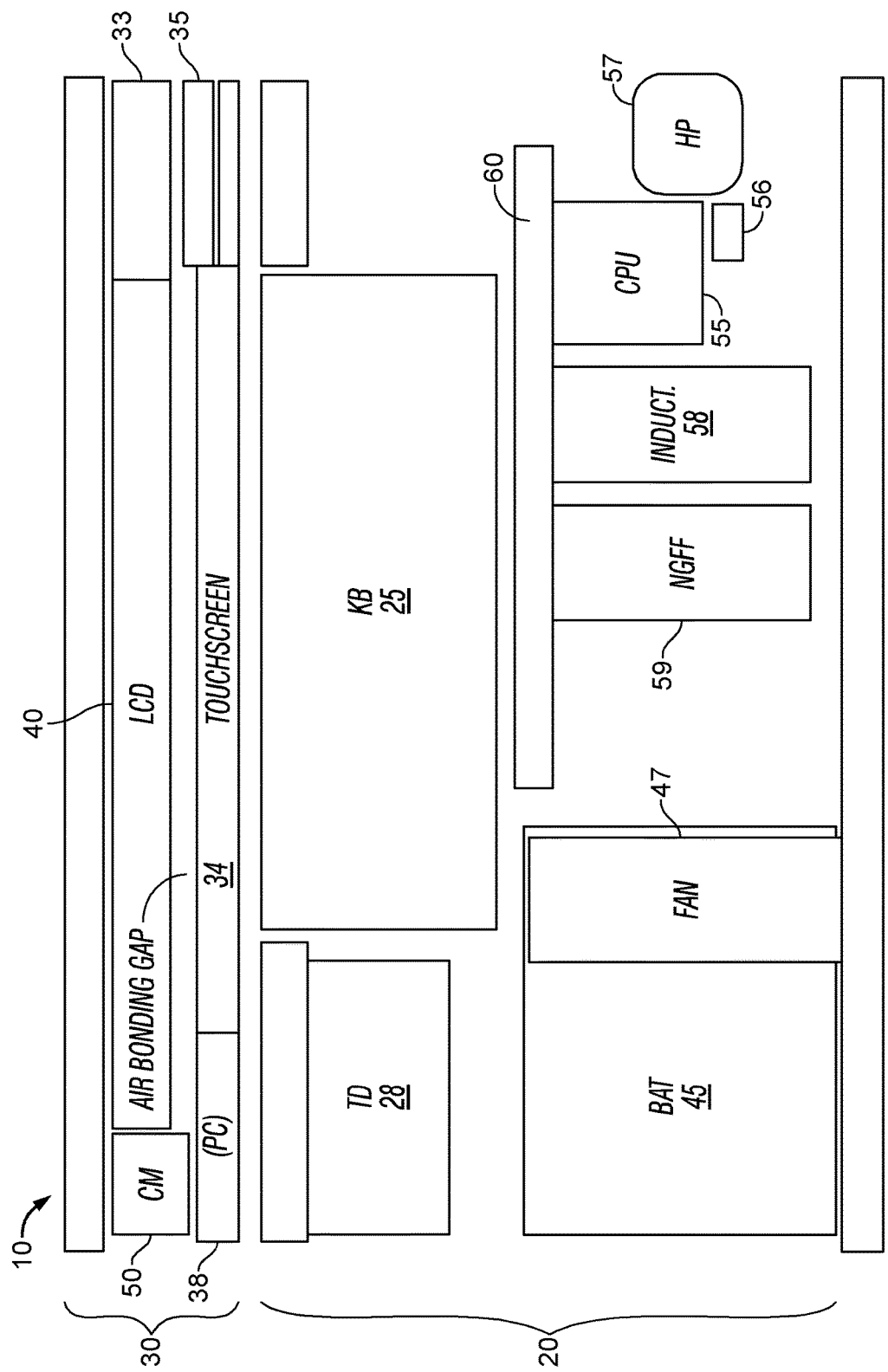
FIG. 3 is a cross-sectional view of a computer system in accordance with an embodiment of the present invention.

Referring now to FIG. 3, shown is a cross-sectional view of a computer system in accordance with an embodiment of the present invention. As shown in FIG. 3, system 10 may correspond to a clamshell-based ultrathin laptop computer having a low-profile and lightweight design. The view in FIG. 3 is a cross-sectional view through a substantial midpoint of the system and is intended to show a high level view of the vertical stack-up or layout of components within the chassis.

In general, the chassis may be split into a lid portion 30 and a base portion 20. In general, lid portion 30 may include the display and related circuitry and components, while base portion 20 may include the main processing elements along with battery and keyboard. However, note that in other implementations of a clamshell design, virtually all of the components other than the keyboard can be adapted within the lid portion to enable a detachable and removable lid portion that doubles as a tablet-based form factor computer.

With regard to lid portion 30, included is a display panel 40 which in an embodiment can be a LCD or other type of thin display such as an OLED. Display panel 40 may be coupled to a display circuit board 33. In addition, a touch screen 34 may be adapted above display panel 40 (when lid portion is in an open portion, but shown below display panel 40 in the illustration of FIG. 3). In an embodiment, touch screen 34 can be implemented via a capacitive sense touch array configured along a substrate, which can be a glass, plastic or other such transparent substrate. In turn, touch screen 34 can be coupled to a touch panel circuit board 35.

As further seen, also within lid portion 30 may be a camera module 50 which in an embodiment can be a high definition camera capable of capturing image data, both of still and video types. Camera module 50 can be coupled to a circuit board 38. Note that all of these components of lid portion 30 may be configured within a chassis that includes a cover assembly that can be fabricated from a plastic or metal material such as a magnesium aluminum (Mg—Al) composite.

Still referring to FIG. 3, the majority of the processing circuitry of system 10 may be present within base portion 20. However, as discussed above in an embodiment that provides for a detachable lid portion, virtually all of these components can instead be implemented in the lid portion.

From view of the top of base portion 20 down, included is a keyboard 25 that can be of various types to enable a thin profile device and can include chicklet type keys or other thin form factor keys. In addition, a touch pad 28 may provide another user interface.

The majority of the components can be configured on a circuit board 60 which may be a motherboard such as a Type IV motherboard that includes various integrated circuits that can be adapted to the circuit board in a variety of manners, including soldered, surface mounted and so forth. With specific reference to FIG. 3, a CPU 55, which may be an ultra low voltage multicore processor, can be adapted to circuit board 60, e.g., via a socket or other type of connection. As seen, to provide a thermal solution, a heat sink 56 may be placed in close relation to CPU 55 and can in turn be coupled to a heat pipe 57, which can be used to transfer heat from the processor and/or other components, e.g., to various cooling locations such as vents, fans or so forth. Also shown configured to circuit board 60 is an inductor 58 and a NGFF edge connector 59. Although not shown for ease of illustration, understand that an add-in card can be configured to connector 59 to provide additional components that can be configured for a particular system. As examples, these components can include wireless solutions and a solid state device (SSD), among other types of peripheral devices. Additional add-in cards may be provided in some implementations.

As further seen in FIG. 3, a battery 45 may further be configured within base portion 20 and may be located in close connection to a portion of the cooling solution which can be implemented in one embodiment by one or more fans 47. Although shown with this particular implementation in the example of FIG. 3, understand the scope of the present invention is not limited in this regard as in other embodiments additional and different components can be present. For example, instead of providing mass storage by way of an SSD, a hard drive can be implemented within base portion 40. To this end, a mini-serial advanced technology attach (SATA) connector can further be coupled to circuit board 60 to enable connection of this hard drive to the processor and other components adapted on circuit board 60. Furthermore, different locations of components can occur to more efficiently use (or reduce) the Z-space.

Figure 4:
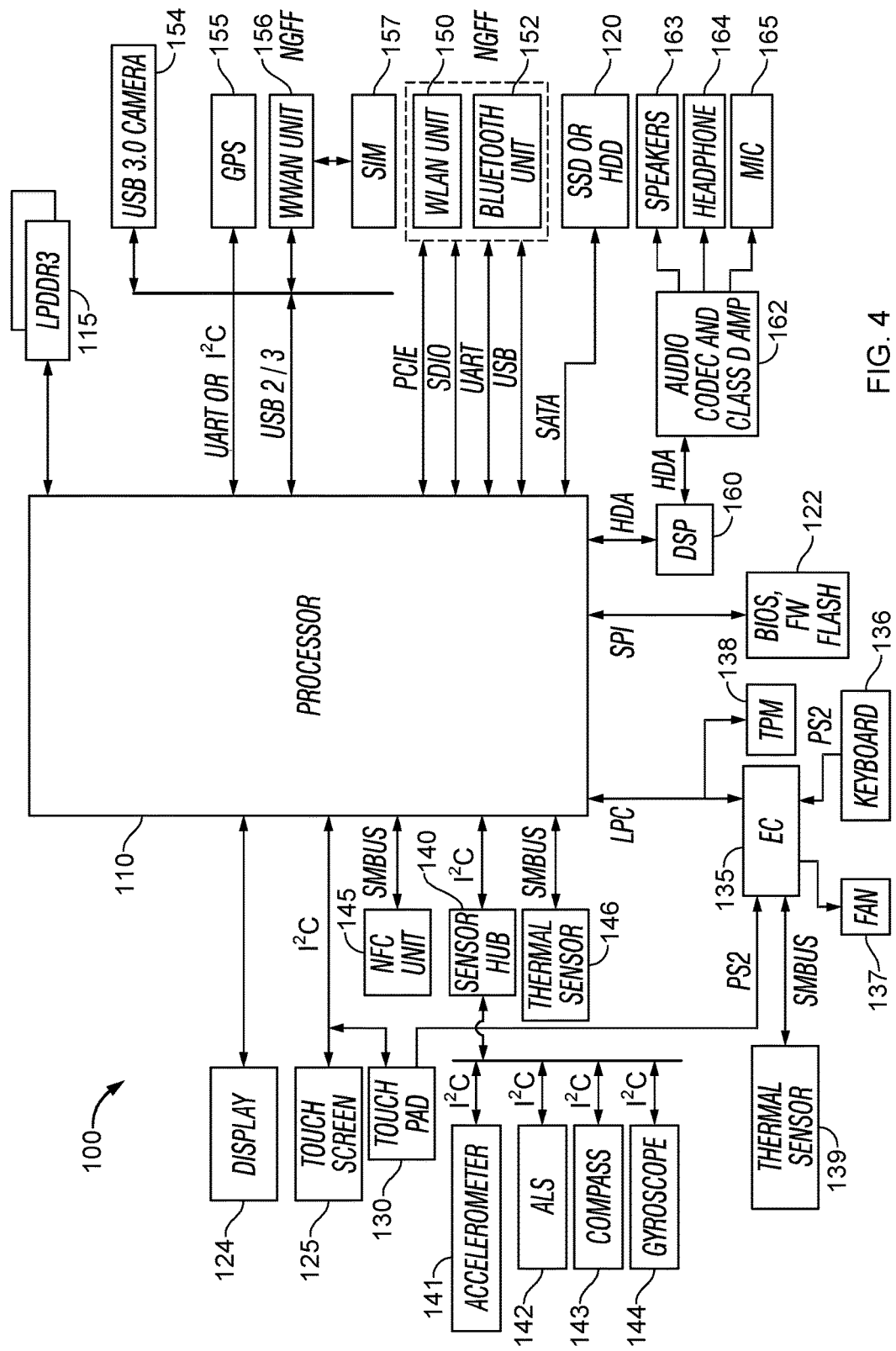
FIG. 4 is a block diagram of components present in a computer system in accordance with an embodiment of the present invention.

Referring now to FIG. 4, shown is a block diagram of components present in a computer system in accordance with an embodiment of the present invention. As shown in FIG. 4, system 100 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 4 is intended to show a high level view of many components of the computer system. However, it is to be understood that additional components may be present in certain implementations and furthermore, different arrangement of the components shown may occur in other implementations.

As seen in FIG. 4, a processor 110, which may be a low power multicore processor socket such as an ultra low voltage processor, may act as a main processing unit and central hub for communication with the various components of the system. Such processor can be implemented as a system on a chip (SoC). In one embodiment, processor 110 may be an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 processor. Certain details regarding the architecture and operation of processor 110 in one implementation will be discussed further below.

Processor 110 may communicate with a system memory 115, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 110 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

To provide for persistent storage of information such as data, applications, one or more operating systems and so forth, a mass storage 120 may also couple to processor 110.

In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 4, a flash device 122 may be coupled to processor 110, e.g., via a serial peripheral interface (SPI). This flash device may provide for non-volatile storage of system software, including a basic input/output software (BIOS) as well as other firmware of the system.

Various input/output (IO) devices may be present within system 100. Specifically shown in the embodiment of FIG. 4 is a display 124 which may be a high definition LCD or LED panel configured within a lid portion of the chassis. This display panel may also provide for a touch screen 125, e.g., adapted externally over the display panel such that via a user's interaction with this touch screen, user inputs can be provided to the system to enable desired operations, e.g., with regard to the display of information, accessing of information and so forth. In one embodiment, display 124 may be coupled to processor 110 via a display interconnect that can be implemented as a high performance graphics interconnect. Touch screen 125 may be coupled to processor 110 via another interconnect, which in an embodiment can be an $I^2C$ interconnect. As further shown in FIG. 4, in addition to touch screen 125, user input by way of touch can also occur via a touch pad 130 which may be configured within the chassis and may also be coupled to the same $I^2C$ interconnect as touch screen 125.

For perceptual computing and other purposes, various sensors may be present within the system and can be coupled to processor 110 in different manners. Certain inertial and environmental sensors may couple to processor 110 through a sensor hub 140, e.g., via an $I^2C$ interconnect. In the embodiment shown in FIG. 4, these sensors may include an accelerometer 141, an ambient light sensor (ALS) 142, a compass 143 and a gyroscope 144. Other environmental sensors may include one or more thermal sensors 146 which may couple to processor 110 via a system management bus (SMBus) bus, in one embodiment.

Also seen in FIG. 4, various peripheral devices may couple to processor 110 via a low pin count (LPC) interconnect. In the embodiment shown, various components can be coupled through an embedded controller 135. Such components can include a keyboard 136 (e.g., coupled via a PS2 interface), a fan 137, and a thermal sensor 139. In some embodiments, touch pad 130 may also couple to EC 135 via a PS2 interface. In addition, a security processor such as a trusted platform module (TPM) 138 in accordance with the Trusted Computing Group (TCG) TPM Specification Version 1.2, dated Oct. 2, 2003, may also couple to processor 110 via this LPC interconnect. Note that the TPM may also be integrated into a security co-processor such as a converged security engine (CSE), SoC security engine or a processor security zone such as a "TrustZone" or a secure enclave.

System 100 can communicate with external devices in a variety of manners, including wirelessly. In the embodiment shown in FIG. 4, various wireless modules, each of which can correspond to a radio configured for a particular wireless communication protocol, are present. One manner for wireless communication in a short range such as a near field may be via a near field communication (NFC) unit 145 which may communicate, in one embodiment with processor 110 via an SMBus. Note that via this NFC unit 145, devices in close proximity to each other can communicate. For example, a user can enable system 100 to communicate with another (e.g.) portable device such as a smartphone of the user via adapting the two devices together in close relation and enabling transfer of information such as identification information payment information, data such as image data or so forth. Wireless power transfer may also be performed using a NFC system.

As further seen in FIG. 4, additional wireless units can include other short range wireless engines including a WLAN unit 150 and a Bluetooth unit 152. Using WLAN unit 150, Wi-Fi™ communications in accordance with a given Institute of Electrical and Electronics Engineers (IEEE) 802.11 standard can be realized, while via Bluetooth unit 152, short range communications via a Bluetooth protocol can occur. These units may communicate with processor 110 via, e.g., a USB link or a universal asynchronous receiver transmitter (UART) link. Or these units may couple to processor 110 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 156 which in turn may couple to a subscriber identity module (SIM) 157. In addition, to enable receipt and use of location information, a GPS module 155 may also be present. Note that in the embodiment shown in FIG. 4, WWAN unit 156 and an integrated capture device such as a camera module 154 may communicate via a given USB protocol such as a USB 2.0 or 3.0 link, or a UART or $I^2C$ protocol. Again the actual physical connection of these units can be via adaptation of a NGFF add-in card to an NGFF connector configured on the motherboard.

To provide for audio inputs and outputs, an audio processor can be implemented via a digital signal processor (DSP) 160, which may couple to processor 110 via a high definition audio (HDA) link. Similarly, DSP 160 may communicate with an integrated coder/decoder (CODEC) and amplifier 162 that in turn may couple to output speakers 163 which may be implemented within the chassis. Similarly, amplifier and CODEC 162 can be coupled to receive audio inputs from a microphone 165 which in an embodiment can be implemented via dual array microphones to provide for high quality audio inputs to enable voice-activated control of various operations within the system. Note also that audio outputs can be provided from amplifier/CODEC 162 to a headphone jack 164. Although shown with these particular components in the embodiment of FIG. 4, understand the scope of the present invention is not limited in this regard.

Figure 5:
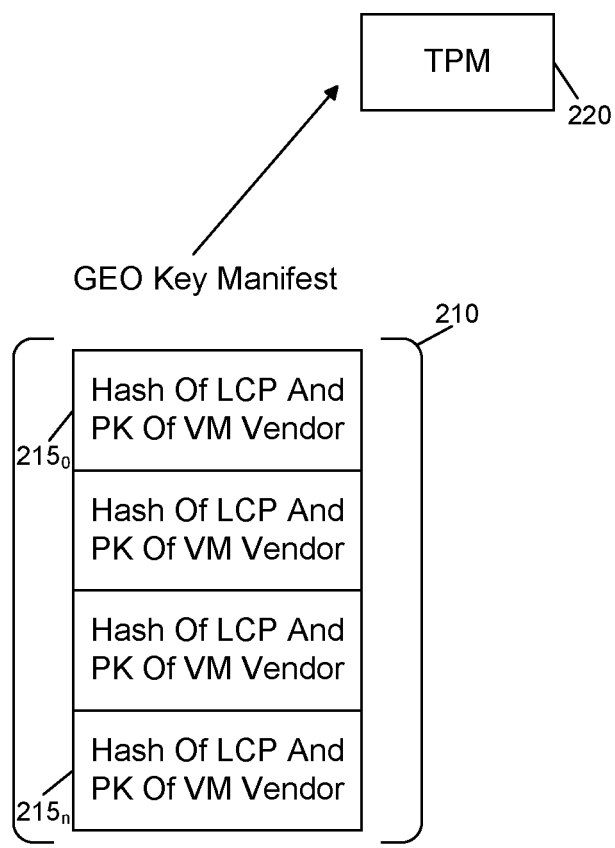
FIG. 5 is a block diagram of a key manifest in accordance with an embodiment of the present invention.

Referring now to FIG. 5, shown is a block diagram of a key manifest in accordance with an embodiment of the present invention. As shown in FIG. 5, key manifest 210 can be authored and stored in a protected storage such as a TPM 220. As seen, manifest 210 may include a set of values associated with a given geographic key. Specifically, manifest 210 includes a plurality of hash values $215_0$-$215_n$. Each such value may correspond to a key to be used for a particular type of agent having a LCP for a given geographic location. This manifest is thus associated with a geography (geo) key for a specific geographic region. In this way an enterprise can divide its operations according to geographic boundaries and represent each partitioning with a key and create a manifest that defines which images can be used in which geography.

In the example shown, each value 215 may correspond to a hash of a launch control policy along with a public key of a virtual machine (VM) or other software agent of a given vendor. Note that LCPs are digitally signed (integrity protected) but typically are not encrypted (confidentiality protected). The public key that verifies the signature is contained in the TPM or it may be embedded in the ACM that enforces the policy. The ACM is signed and verified by certain secure hardware/microcode. In an embodiment, a LCP policy structure may include various information including metadata such as version information, hash algorithm information, a policy type, secure code version information, data revocation counters, policy control values, and policy data.

In the example of FIG. 5, each value 215 can be associated with a given application or other software agent that may be subject to a launch control policy within a specific geographic region. For example, one of values 215 may correspond to an email application, another one corresponding to a word processing application, and another one corresponding to an advanced manufacturing tool. Some of the values can indicate that a user in the given geographic location can execute the associated software agent, while other such values may indicate that a VM containing an application (such as an email application) is not authorized to be executed in the given location. For example, with the above-described list of software agents, assume that in one geographic location, a user is enabled to execute the email application and the word processing application but not the manufacturing tool, while in another location, e.g., the location in which the manufacturing facility to be run using the tool is located, this value may indicate valid usage within that geographic region.

Figure 6:
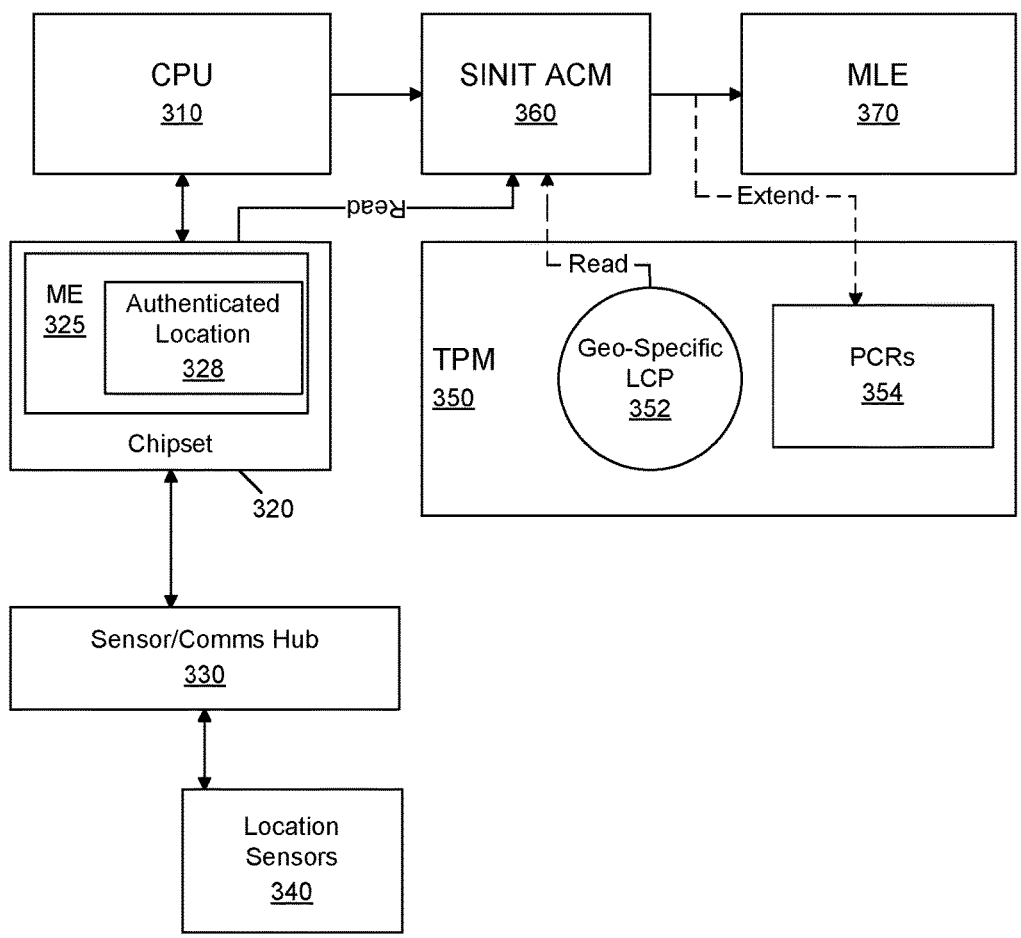
FIG. 6 is a block diagram of a system arrangement in accordance with an embodiment of the present invention illustrating a launch execution process.

Referring now to FIG. 6, shown is a block diagram of a system arrangement in accordance with an embodiment of the present invention illustrating a launch execution process. As seen in FIG. 6, system 300 may include a CPU 310. In various embodiments, this CPU may be a SoC or other multicore processor and can include secure execution technologies such as Intel® TXT™ technology to enable a trusted execution environment. This environment establishes a root of trust that evaluates the computing platform, including measuring platform components in the boot and launch environment (such as BIOS, an operating system (OS) loader, virtual machine manager, and other components). This root also provides a trusted position to evaluate the integrity of any other component. Once a basic root of trust and a secure basis for measurement and evaluation is established, other mechanisms can be used to seal and protect secrets in memory, as well as provide local or remote attestation of system configuration.

As seen in the embodiment of FIG. 6, CPU 310 may be coupled to a chipset 320. Although shown as separate components in the embodiment of FIG. 6, understand that in some implementations chipset 320 may be implemented within the same package as CPU 310, particularly when the CPU is implemented as an SoC. As seen, chipset 320 may include a manageability engine 325 including authenticated location information 328 which can include keys such as described herein.

To determine a location of platform 310, various components may be present including, in the embodiment of FIG. 6, a sensor/communications hub 330 which may be a stand-alone hub or configured within chipset 320. As seen, one or more location sensors 340 may be in communication with hub 330. As examples for purposes of illustration, the location sensors may include a GPS module or other such dedicated location sensor. Other sensors, such as inertial and environmental sensors may also be used to present location information. Also, in various embodiments one or more wireless communication modules may also provide location information. For example, a triangulation operation can be implemented using communications between the platform and a wireless network such as WLAN or WWANs, e.g., a given cellular system in accordance with a 3G or 4G/LTE communication protocol. Still further, location information can also be determined via identification of wireless access points in a local area network with the platform, which identifications can then be used to then determine the location of the platform. Of course location can be determined in other manners in yet further embodiments.

As further seen in FIG. 6, platform 300 may further include a TPM 350 that may itself include one or more geo-specific launch control policies 352 and a set of platform configuration registers (PCRs) 354, the details of which will be discussed further below.

In addition to these components, platform 300 further includes an authenticated code module 360 which in an embodiment can be a secure initialization (SINIT) authenticated code module (ACM) that executes on CPU 310. If this authenticated code module is successfully traversed, platform 300 may then enter into a measured launch embodiment (MLE) 370, in which one or more software agents, such as a given application to be executed, can be activated.

FIG. 6 further shows the flow of information to determine whether a given MLE is enabled to be launched. Specifically, based on information from one or more location sensors, an authenticated location of the platform can be determined within chipset 320. In one embodiment a system management mode (SMM) can read a PCI configuration register in ME 325 that is used to serve as a drop box to pass information. That is, location information can be signed by a key of the ME and placed in that drop box location for the SMM to read. This authenticated location information is provided to ACM 360, which further may receive information regarding a given geo-specific LCP. ACM 360 reads policies, and may perform a comparison to the authorized location and extend the result of the comparison into one or more of PCRs 354. Thus based on this measurement and analysis of these values, ACM 360 can determine whether the given location at which platform 300 is present matches a location identified in one or more geo-specific LCPs. If so, this resulting matching information can be extended into one or more PCRs 354. Also, if the match is indicated MLE 370 can be entered in which a desired software agent can be initiated and enabled for execution on platform 300. If instead no match occurs, and the current location of the platform does not fall within an approved geographic location within the geo-specific LCPs, the MLE 370 may not be enabled and a default agent, such as a safe mode launch, can occur. In some embodiments a secure boot policy may cause the platform to not even boot if it is not within a given geofence boundary.

Note that although described herein as including both an analysis and enforcement mechanism, in some embodiments, analysis can occur to generate and store logging information and a desired application can be launched regardless of location of the platform. Note that this of course is application and LCP specific. Also note that while shown and described in FIG. 6 as including an ACM, in other embodiments, a similar geographic analysis and launch control mechanism can be provided for a dynamic launch during post-boot activity of a system.

Figure 7:
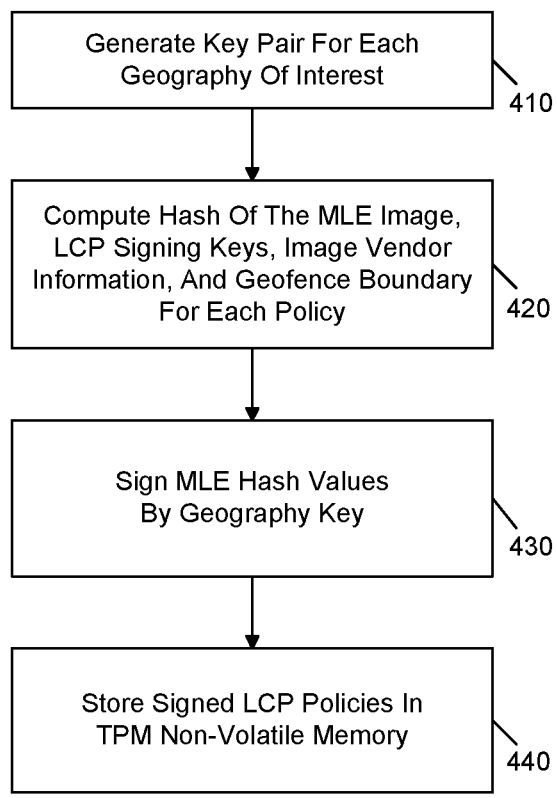
FIG. 7 is a flow diagram of a launch control policy authoring process in accordance with an embodiment of the present invention.

Referring now to FIG. 7, shown is a flow diagram of a launch control policy authoring processing in accordance with an embodiment of the present invention. As shown in FIG. 7, method 400 can be implemented to author one or more geo-specific launch control policies. Method 400 may begin by generating a key pair for each geography of interest (block 410). In one embodiment, this key pair can be generated as an asymmetric key pair that includes a hash of the LCP and a public key of the policy-issuing authority. In an embodiment, the LCP policy includes a hash of MLE code, LCP public key used to sign the manifest, vendor information (e.g., name uniform resource locator (URL), etc.), and a geo-fence expression (e.g., a list of X, Y coordinates defining a closed space).

Control passes to block 420 where a hash can be generated of a measured launch environment image, the LCP signing keys, image vendor information and geofence boundary. This hash can be made of the measured launch environment image (e.g., the VM to be launched subject to the key), the launch control policy setting keys, the image vendor information, e.g., as computed by a vendor, or information technology (IT) personnel. The geofence information is calculated for each policy to identify the boundary. Note that a geofence boundary can be computed for each such policy.

In an embodiment, this geofence boundary can be generated in relation to various information including GPS coordinate information that identifies a boundary within which the policy is to be effected, or other location-based information such as street address information or so forth. In various embodiments, the geographic region could take any shape and the coordinates are based on the type of location information. For example three or more GPS coordinates can define the shape. For an indoor location, the physical location of one or more WiFi™ access points can be used to determine the relative location of endpoints to those WiFi™ access points to thus determine if a platform is within some range.

Control next passes to block 430 where the MLE hash values can be signed by a geography key for a location in which the MLE image is permitted to be loaded within a trusted execution environment. Finally, these signed LCP policies can be stored in a storage such as a TPM or other non-volatile storage (block 440). This storage may be implemented with an access rule that releases the policy only if a given ACM is in control of the platform. Although shown with this particular implementation of authoring an LCP, understand the scope of the present invention is not limited in this regard.

Figure 8:
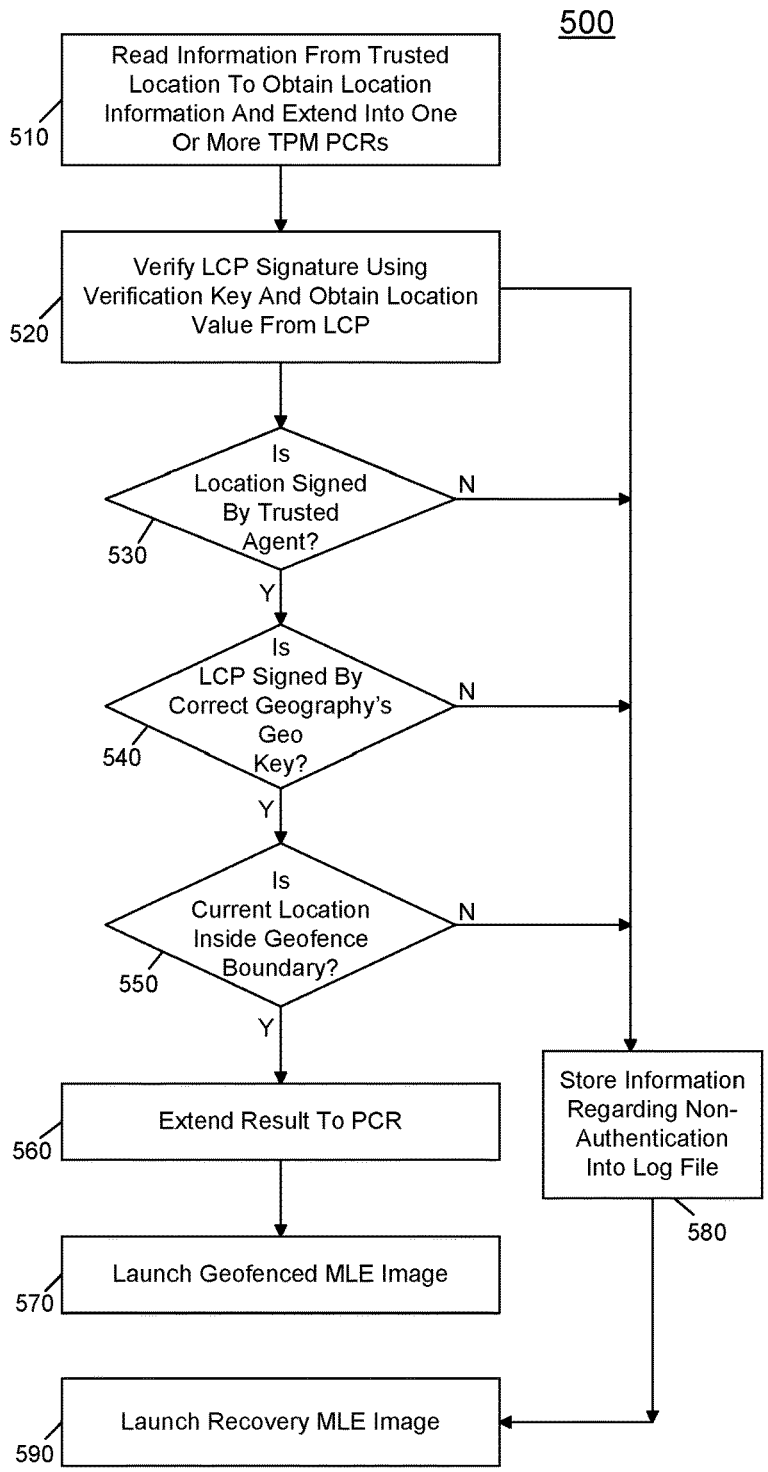
FIG. 8 is a flow diagram of a method for performing location-based authentication in accordance with an embodiment of the present invention.

Referring now to FIG. 8, shown is a flow diagram of a method for performing location-based authentication in accordance with an embodiment of the present invention. As shown in FIG. 8, method 500 may begin by reading location information from a trusted location, e.g., from a location within a ME such as the drop box mechanism described above. More specifically at block 510, an authenticated code module can read this location information and use the obtained information to extend one or more PCRs within a TPM. For example, a string can be generated to indicate that geo location X equals platform P (meaning the platform is in location X). This string can be hashed and extended into the PCR. Control next passes to block 520 where the ACM can verify a LCP signature using a verification key, and then a location value can be obtained from the LCP. Next, control passes to block 530 where it can be determined whether the location is signed by a trusted agent. In one embodiment, this determination can be based on an asymmetric signing key such as an enhanced privacy identifier (EPID) which can be implemented via public and private keys of an asymmetric cryptographic system that includes multiple private keys for a single instance of a public key. Here the ACM can use a hash of a manufacturer's certification authority to verify the EPID key.

If the location information is authenticated, control passes to diamond 540 where it can be determined whether the LCP is signed by the correct geography's geo key, which in an embodiment can be obtained from the TPM. If so, control passes to diamond 550 where it can be determined whether the current location of the platform is within the geofence boundary. If so, this result or match can be extended to a PCR (block 560). Control thus passes to block 570 where a geofenced MLE image may be launched.

Note that if instead at any of diamonds 530, 540 and 550 the determination is in the negative, control passes to block 580 where the information regarding the authentication may be stored into a log file, e.g., within a PCR. As an example a string regarding the platform's location (as described above) can be hashed. This hash is then extended into a PCR, and the string itself can be stored into a PCR log file. Control passes to block 590 in this event, where an MLE recovery image may be launched. The recovery image could be display of a dialog to the user to indicate that the requested agent cannot be accessed in the platform's current location.

Note that FIG. 8 thus is directed to a method that includes an enforcement mechanism. In other embodiments, instead of selectively launching a geofenced MLE image or a recovery MLE image depending on whether the current location is authorized and is within the geofence boundary, logging operations only may be performed and the desired MLE can be accessed regardless of the result of the determinations above. Although shown at this high level in the embodiment of FIG. 8, understand the scope of the present invention is not limited in this regard.

Figure 9:
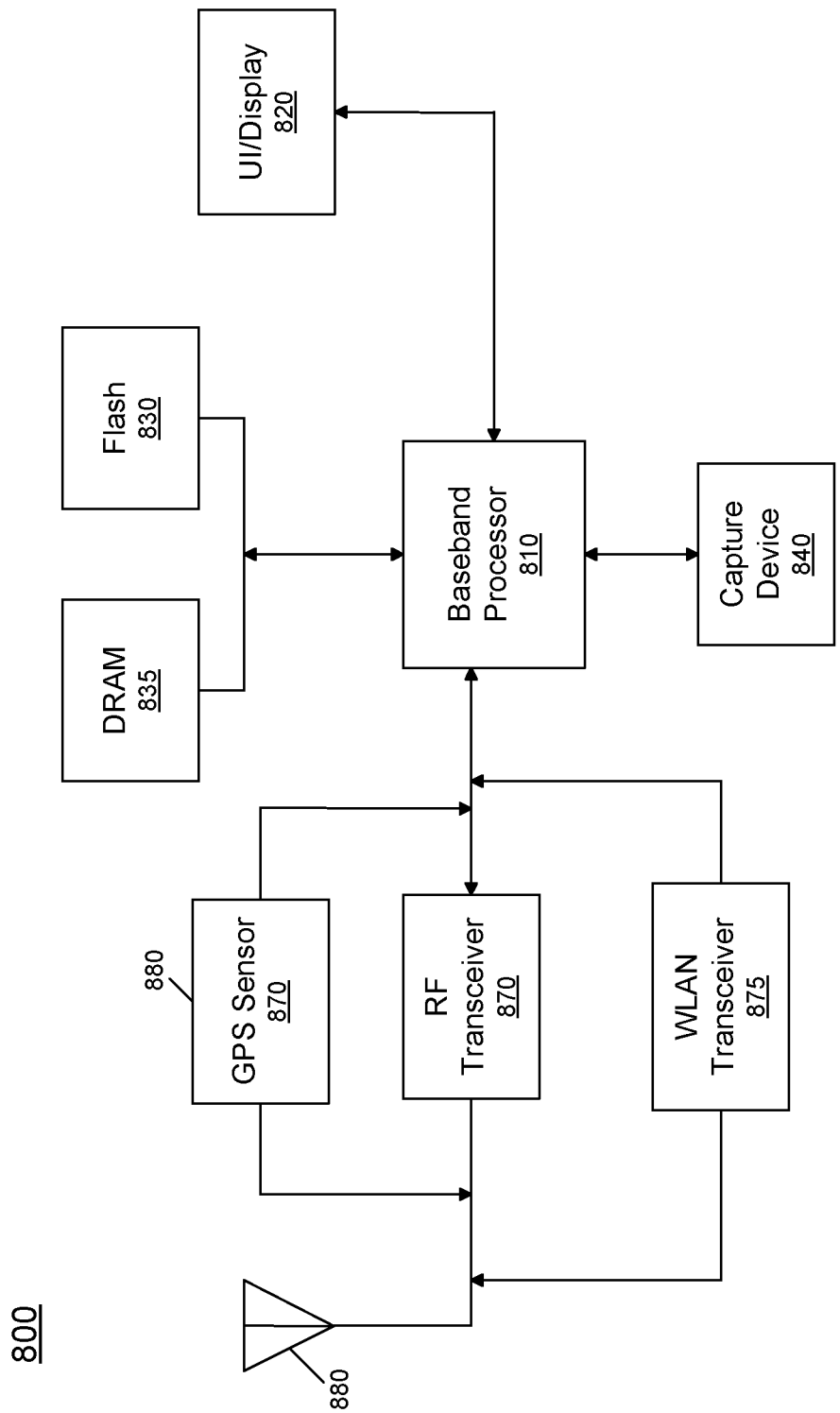
FIG. 9 is a block diagram of an example system with which embodiments can be used.

Embodiments can be used in many different environments. Referring now to FIG. 9, shown is a block diagram of an example system 800 with which embodiments can be used. As seen, system 800 may be a smartphone or other wireless communicator. As shown in the block diagram of FIG. 9, system 800 may include a baseband processor 810 which can include a security engine such as a manageability engine and other trusted hardware support to perform geographic-based authentications before allowing a user to access a selected agent. In general, baseband processor 810 can perform various signal processing with regard to communications, as well as perform computing operations for the device. In turn, baseband processor 810 can couple to a user interface/display 820 which can be realized, in some embodiments by a touch screen display. In addition, baseband processor 810 may couple to a memory system including, in the embodiment of FIG. 9 a non-volatile memory, namely a flash memory 830 and a system memory, namely a dynamic random access memory (DRAM) 835. As further seen, baseband processor 810 can further couple to a capture device 840 such as an image capture device that can record video and/or still images.

To enable communications to be transmitted and received, various circuitry may be coupled between baseband processor 810 and an antenna 880. Specifically, a radio frequency (RF) transceiver 870 and a wireless local area network (WLAN) transceiver 875 may be present. In general, RF transceiver 870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 880 may be present. Other wireless communications such as receipt or transmission of radio signals, e.g., AM/FM and other signals may also be provided. In addition, via WLAN transceiver 875, local wireless signals, such as according to a Bluetooth™ standard or an IEEE 802.11 standard such as IEEE 802.11a/b/g/n can also be realized. One or more of transceivers 870, 875 and GPS sensor 880 can be used to provide geographic information for use in launch control in accordance with an embodiment of the present invention. Although shown at this high level in the embodiment of FIG. 9, understand the scope of the present invention is not limited in this regard.

Embodiments may be used in many different types of systems.

For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments. In an embodiment, a system includes a processor to execute instructions; a manageability engine coupled to the processor to authenticate a location of the system, and including a storage to store the authenticated location of the system; at least one location sensor to determine the location of the system and to provide the location to the manageability engine; and a TPM including a storage to store a geographic key manifest including a plurality of LCPs each associating a policy with a software agent and a location. The processor can determine whether the authenticated location of the system is within a geofence boundary of a LCP associated with a software agent, and if so to enable the software agent. The at least one location sensor may include a wireless engine to provide an identification of one or more wireless access points in communication with the wireless engine, and the manageability engine may determine the location of the system based at least in part on the identification. The TPM may include a plurality of PCRs. The processor may extend a result of a comparison of the authenticated location to a location of at least one of the LCPs into one of the plurality of PCRs. The processor may execute a pre-boot authenticated module to determine whether to enable the software agent corresponding to a measured launch environment.

In another embodiment, a method includes determining a location of a system responsive to location information received from at least one of a location sensor and a wireless device of the system; associating the location with a key present in the system to generate an authenticated location of the system; determining, in a trusted agent of the system, whether the authenticated location is within a geofence boundary indicated in a location portion of a LCP that provides a geographic-specific policy; and applying, via the trusted agent, a policy set forth in the LCP based on the determining. Applying the policy may include launching a MLE image if the authenticated location is within the geofence boundary, and launching a recovery MLE image if the authenticated location is not within the geofence boundary. Also, applying the policy may include storing information associated with determining whether the authenticated location is within the geofence boundary in a log file. Associating the location can include determining that the key is an authenticated key. In an embodiment, the launch control policy is one of a plurality of LCPs stored in a geographic key manifest and signed by a geographic key, each of the plurality of LCPs providing a geographic-specific policy. In this embodiment, each of the plurality of LCPs includes a hash of the LCP and a key of a software agent, wherein the corresponding LCP is signed by the geographic key. Note that the geographic key manifest can be stored in a trusted platform module of the system. The method may further include determining the location, associating the location and determining whether the authenticated location is within the geofence boundary during a secure pre-boot environment of the system.

In another embodiment, at least one machine-readable storage medium includes instructions that when executed cause a system to receive a location of the system; compare the location to a policy location stored in a first value of a geographic key manifest signed by a geographic key, where the first value associates a policy with the policy location and a software agent; and log a result of the comparison in a trusted storage. The medium may further include instructions that when executed cause the system to enable the software agent responsive to the location matching the policy location, where the software agent comprises a MLE, and otherwise to enable a recovery agent. The medium may further includes instructions that when executed cause the system to determine the location of the system responsive to location information received from at least one of a location sensor and a wireless device of the system. The medium may further include instructions that when executed cause the system to associate the location of the system with a key present in the system to generate an authenticated location of the system. The medium may also include instructions that when executed cause the system to determine, in a trusted agent of the system, whether the authenticated location is within a geofence boundary indicated by the policy location of the first value. The medium can still further include instructions that when executed cause the system to extend the result into a PCR of the trusted agent, and obtain the first value of the geographic key manifest from the trusted agent.

In another embodiment, an apparatus includes means for determining a location of a system responsive to location information received from at least one of a location sensor and a wireless device of the system, means for associating the location with a key present in the system to generate an authenticated location of the system, and means for determining whether the authenticated location is within a geofence boundary indicated in a location portion of a LCP that provides a geographic-specific policy. A secure storage means may be included for storing a plurality of LCPs each signed by a geographic key, each of the plurality of LCPs providing a geographic-specific policy. A control means may be provided for applying the policy comprising launching a MLE image if the authenticated location is within the geofence boundary and otherwise launching a recovery MLE image if the authenticated location is not within the geofence boundary.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computing device with technology for implementing and authenticating geo-specific launch control policies, the computing device comprising:
    a hardware processor;
    a location sensor in communication with the hardware processor, the location sensor configured to provide geographic information identifying a current location of the computing device;
    at least one secure storage in communication with the hardware processor;
    multiple geo-specific public keys in the secure storage, wherein at least one of the geo-specific public keys corresponds to a geo-specific private key, and wherein each set of corresponding geo-specific public and private keys is associated with a predetermined location;
    a geographic launch control policy (LCP) manifest in the secure storage;
    at least one geo-specific LCP record in the geographic LCP manifest, the geo-specific LCP record comprising:
        a launch policy for a software agent of the computing device, wherein the launch policy provides for different results, depending on whether the current location of the computing device is an approved location for the software agent; and
        a digital signature that was created using a key among the geo-specific private keys that is associated with the approved location for the software agent; and
    a geo-policy code module that, when executed on the hardware processor, (i) automatically determines whether to launch a desired software agent, based on geo-policy conditions comprising (a) the current location of the computing device, (b) existence in the geographic LCP manifest of at least one geo-specific LCP record that is associated with the current location of the computing device and with the desired software agent, and (c) authenticity of said geo-specific LCP record, and (ii) automatically launches a recovery agent in response to failure of one or more of the geo-policy conditions; and
    wherein the geo-policy code module is configured to use at least one of the geo-specific public keys to evaluate the authenticity of said geo-specific LCP record.

2. The computing device of claim 1, wherein the operation of automatically determining whether to launch the desired software agent comprises:
    automatically determining whether at least one geo-specific LCP record in the geographic LCP manifest corresponds to the current location of the computing device;
    automatically retrieving the geo-specific public key for the current location of the computing device from the secure storage; and
    automatically using the geo-specific public key for the current location of the computing device to determine whether said geo-specific LCP record was signed by the geo-specific private key that corresponds to the current location of the computing device.

3. The computing device of claim 1, wherein the geo-policy code module automatically prevents the computing device from launching an unauthorized software agent in response to a determination that the geographic LCP manifest does not contain a trustworthy geo-specific LCP that identifies the unauthorized software agent as authorized to execute at the current location of the computing device.

4. A computing device according to claim 1, wherein the geo-policy code module comprises an authenticated code module.

5. A computing device according to claim 1, wherein:
    the at least one secure storage comprises a first secure storage and a second secure storage;
    the computing device comprises (a) a manageability engine comprising the first secure storage and (b) a trusted platform module (TPM) comprising the second secure storage; and
    the geo-policy code module, when executed on the hardware processor, automatically retrieves the geographic information from the manageability engine, and automatically retrieves the geo-specific public key from the TPM.

6. A computing device according to claim 5, wherein:
    the geographic information comprises a digital signature; and
    the operation of automatically determining whether to launch the desired software agent further comprises:
        using the digital signature for the geographic information to authenticate the geographic information; and
        automatically determining not to launch the desired software agent in response to a determination that the geographic information is not trustworthy.

7. A computing device according to claim 6, wherein the operation using the digital signature for the geographic information to authenticate the geographic information comprises:
    using a public key from a manufacturer of the computing device to determine whether the digital signature for the geographic information was created using a corresponding private key from the manufacturer of the computing device.

8. A computing device according to claim 1, further comprising:
    a trusted platform module (TPM) containing at least one platform configuration register (PCR); and
    wherein the geo-policy code module, when executed on the hardware processor, automatically extends information about geo-policy authentication results into the PCR.

9. A method for implementing and authenticating geo-specific launch control policies, the method comprising:

in a computing device comprising a geo-policy code module and secure storage containing (a) multiple geo-specific public keys, wherein at least one of the geo-specific public keys corresponds to a geo-specific private key, and wherein each set of corresponding geo-specific public and private keys is associated with a predetermined location, (b) a geographic launch control policy (LCP) manifest, and (c) at least one geo-specific LCP record in the geographic LCP manifest, wherein the geo-specific LCP record comprises a launch policy for a software agent of the computing device, wherein the launch policy provides for different results depending on whether a current location of the computing device is an approved location for the software agent, and wherein the geo-specific LCP record further comprises a digital signature that was created using a key among the geo-specific private keys that is associated with the approved location for the software agent automatically using the geo-policy code module and the geographic LCP manifest to determine whether to launch a desired software agent on the computing device, based on geo-policy conditions comprising (a) the current location of the computing device, (b) existence in the geographic LCP manifest of a geo-specific LCP record that is associated with the current location of the computing device and with the desired software agent, and (c) authenticity of said geo-specific LCP record; and automatically launching a recovery agent in response to failure of one or more of the geo-policy conditions; and wherein the operation of determining whether to launch the desired software agent comprises using at least one of the geo-specific public keys to evaluate the authenticity of said geo-specific LCP record.

10. The method of claim 9, wherein the operation of determining whether to launch the desired software agent comprises:

automatically determining whether at least one geo-specific LCP record in the geographic LCP manifest corresponds to the current location of the computing device;

automatically retrieving the geo-specific public key for the current location of the computing device from the secure storage; and automatically using the geo-specific public key for the current location of the computing device to determine whether said geo-specific LCP record was signed by the geo-specific private key that corresponds to the current location of the computing device.

11. The method of claim 9, further comprising:

automatically preventing the computing device from launching an unauthorized software agent in response to a determination that the geographic LCP manifest does not contain a trustworthy geo-specific LCP that identifies the unauthorized software agent as authorized to execute at the current location of the computing device.

12. The method of claim 9, wherein:

the at least one secure storage comprises a first secure storage and a second secure storage;

the computing device comprises (a) a manageability engine comprising the first secure storage and (b) a trusted platform module (TPM) comprising the second secure storage; and the geo-policy code module, when executed on the hardware processor, automatically retrieves geographic information identifying the current location of the computing device from the manageability engine, and automatically retrieves the geo-specific public key from the TPM.

13. The method of claim 12, wherein:

the geographic information comprises a digital signature; and the operation of automatically determining whether to launch the desired software agent further comprises:
using the digital signature for the geographic information to authenticate the geographic information; and
automatically determining not to launch the desired software agent in response to a determination that the geographic information is not trustworthy.

14. The method of claim 13, wherein the operation using the digital signature for the geographic information to authenticate the geographic information comprises:

using a public key from a manufacturer of the computing device to determine whether the digital signature for the geographic information was created using a corresponding private key from the manufacturer of the computing device.

15. An apparatus for implementing and authenticating geo-specific launch control policies, the apparatus comprising:

at least one non-transitory machine-readable storage medium; and instructions in the storage medium that, when executed by a computing device, implement a geo-policy code module which causes the computing device to (i) automatically use a geographic launch control policy (LCP) manifest from secure storage of the computing device to determine whether to launch a desired software agent on the computing device, based on geo-policy conditions comprising (a) a current location of the computing device, (b) existence in the geographic LCP manifest of a geo-specific LCP record that is associated with the current location of the computing device and with the desired software agent, and (c) authenticity of said geo-specific LCP record, and (ii) automatically launch a recovery agent in response to failure of one or more of the geo-policy conditions; and wherein the operation of determining whether to launch the desired software agent comprises:
retrieving, from the secure storage, a geo-specific public key that is associated with the current location of the computing device; and
using said geo-specific public key to determine whether said geo-specific LCP record comprises a digital signature that was signed using a private key that is also associated with the current location of the computing device.

16. An apparatus according to claim 15, wherein the operation of determining whether to launch the desired software agent further comprises automatically determining whether at least one geo-specific LCP record in the geographic LCP manifest corresponds to the current location of the computing device.

17. An apparatus according to claim 15, wherein:

the secure storage comprises a first secure storage and a second secure storage;

the computing device comprises (a) a manageability engine comprising the first secure storage and (b) a trusted platform module (TPM) comprising the second secure storage; and the geo-policy code module, when executed, automatically retrieves geographic information identifying the current location of the computing device from the manageability engine, and automatically retrieves the geo-specific public key from the TPM.

18. An apparatus according to claim 17, wherein:

the geographic information comprises a digital signature; and the operation of automatically determining whether to launch the desired software agent further comprises:
using the digital signature for the geographic information to authenticate the geographic information; and
automatically determining not to launch the desired software agent in response to a determination that the geographic information is not trustworthy.

19. An apparatus according to claim 18, wherein the operation using the digital signature for the geographic information to authenticate the geographic information comprises:

using a public key from a manufacturer of the computing device to determine whether the digital signature for the geographic information was created using a corresponding private key from the manufacturer of the computing device.

20. An apparatus according to claim 15, wherein the geo-policy code module, when executed by the computing device, automatically prevents the computing device from launching an unauthorized software agent in response to a determination that the geographic LCP manifest does not contain a trustworthy geo-specific LCP that identifies the unauthorized software agent as authorized to execute at the current location of the computing device.

* * * * *